United States Patent
Park et al.

(10) Patent No.: US 8,620,322 B2
(45) Date of Patent: Dec. 31, 2013

(54) METHOD AND SYSTEM OF HANDOVER BASED ON CHANNEL QUALITY AND LOADING

(75) Inventors: Sungki Park, Ashburn, VA (US); Durga P. Satapathy, Ashburn, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 542 days.

(21) Appl. No.: 12/760,546

(22) Filed: Apr. 14, 2010

(65) Prior Publication Data

US 2011/0256870 A1 Oct. 20, 2011

(51) Int. Cl.
*H04W 36/00* (2009.01)

(52) U.S. Cl.
USPC ........... 455/436; 455/437; 455/438; 455/439; 455/440; 455/441; 455/442; 455/443; 455/444

(58) Field of Classification Search
USPC .................................... 455/436–444
See application file for complete search history.

(56) References Cited

U.S. PATENT DOCUMENTS

| | | | | |
|---|---|---|---|---|
| 7,209,712 | B2 * | 4/2007 | Holtzman | 455/67.13 |
| 7,711,372 | B2 * | 5/2010 | Iyer et al. | 455/447 |
| 8,036,675 | B2 * | 10/2011 | Chayat et al. | 455/453 |
| 8,320,328 | B2 * | 11/2012 | Attar et al. | 370/331 |
| 8,358,624 | B1 * | 1/2013 | Ghaus et al. | 370/331 |
| 2002/0071419 | A1 | 6/2002 | Paranchych et al. | |
| 2004/0072567 | A1 | 4/2004 | Cao et al. | |
| 2005/0164709 | A1 | 7/2005 | Balasubramanian et al. | |
| 2005/0201331 | A1 | 9/2005 | Gaal et al. | |
| 2006/0111111 | A1 | 5/2006 | Ovadia | |
| 2006/0276189 | A1 | 12/2006 | Kiernan et al. | |
| 2007/0245025 | A1 | 10/2007 | Venkatachalam | |
| 2008/0026760 | A1 | 1/2008 | Park et al. | |
| 2008/0056172 | A1 | 3/2008 | Nakatsugawa | |
| 2008/0069042 | A1 | 3/2008 | Ballarini et al. | |
| 2008/0081625 | A1 | 4/2008 | Ergen et al. | |

(Continued)

FOREIGN PATENT DOCUMENTS

| | | | | |
|---|---|---|---|---|
| EP | 2 073 579 A1 * | 6/2009 | | H04W 4/00 |
| WO | 00/65863 | 11/2000 | | |
| WO | 01/47288 A2 | 6/2001 | | |

OTHER PUBLICATIONS

Antti Makelainen, "Analysis of Handoff Performance in Mobile WiMAX Networks," Helsinki University of Technology pp. 1-72 (2007).

(Continued)

*Primary Examiner* — Liton Miah

(57) ABSTRACT

A base station may decide to initiate a handover of a communication with a mobile station from a first wireless link to a new wireless link and identify one or more wireless links for the handover. For each identified wireless link, the base station may then determine a channel-quality metric, a wireless-link loading metric, and perhaps a coverage-area loading metric. In turn, the base station may then select the new wireless link based on the channel-quality metric and one or both of the wireless-link loading metric and the coverage-area loading metric. For example, the base station may apply a linear function that includes as variables the channel-quality metric and the wireless-link loading metric, and the base station may select the identified wireless link that best satisfies this function. The base station may then facilitate the handover of the communication from the first wireless link to the selected new wireless link.

17 Claims, 4 Drawing Sheets

(56) References Cited

U.S. PATENT DOCUMENTS

| | | | |
|---|---|---|---|
| 2009/0028112 A1* | 1/2009 | Attar et al. | 370/332 |
| 2009/0046573 A1* | 2/2009 | Damnjanovic | 370/216 |
| 2009/0137251 A1 | 5/2009 | Ji et al. | |
| 2009/0149184 A1 | 6/2009 | Hohne et al. | |
| 2009/0196193 A1* | 8/2009 | Frenger et al. | 370/252 |
| 2009/0285158 A1 | 11/2009 | Rezaiifar et al. | |
| 2010/0173631 A1* | 7/2010 | Kim et al. | 455/436 |

OTHER PUBLICATIONS

Zdenek Becvar et al, "Initialization of Handover Procedure in WiMAX Networks," ICT MobileSummitt, pp. 1-10 (2009).

Thomas Casey, "Base Station Controlled Load Balancing in Mobile WiMAX," Elektrobit Corporation, (Jan. 29, 2008).

Dr. Mustafa Ergen, "The Access Service Network in WiMAX: The Role of SN-GW," (Oct. 2007).

* cited by examiner

METHOD AND SYSTEM OF HANDOVER BASED ON CHANNEL QUALITY AND LOADING

BACKGROUND

In a typical cellular wireless network, an area is divided geographically into a number of coverage areas, such as cells and sectors, each defined by a radio frequency (RF) radiation pattern from a respective base station. Within each coverage area, the base station's RF radiation pattern provides one or more wireless links, each on a corresponding carrier, over which mobile stations may communicate with the cellular wireless network. In turn, the cellular wireless network may provide connectivity with one or more other networks, such as the public switched telephone network (PSTN) or the Internet.

In many protocols, a mobile station communicates with the cellular wireless network over only a single wireless link at any given time. For various reasons, the mobile station or the cellular wireless network may then initiate a "handover" of the communication from a current wireless link to a new wireless link. In turn, the mobile station and the access network may work together to hand over the communication from the current wireless link to the new wireless link. In this respect, the mobile station typically selects the new wireless link based on the limited information available to it, which is typically channel quality of available wireless links. While this procedure generally works well to facilitate seamless service of the mobile station as it moves between wireless coverage areas, an improved handover procedure that accounts for both channel quality and loading on the available wireless links is desired.

OVERVIEW

Disclosed herein are methods of handing over a communication with a mobile station between wireless links of an access network.

A first method may include a first base station of an access network (a) deciding to initiate a handover of a communication with a mobile station from a first wireless link to a new wireless link, (b) identifying one or more wireless links available for the handover, (c) for each identified wireless link, (1) determining a channel-quality metric (e.g., carrier-to-interference noise ratio (CINR)) and a wireless-link loading metric (e.g., an average percentage of assigned resources to total resources on the wireless link) and (2) applying a linear function that includes as variables the channel-quality metric and the wireless-link loading metric, (d) selecting the new wireless link based on the application of the linear function for each identified wireless link, and (e) facilitating the handover of the communication from the first wireless link to the selected new wireless link. Additionally, before selecting the new wireless link based on the application of the linear function for each wireless link, the first method may include the first base station eliminating from consideration any wireless link having one or both of a channel-quality metric below a first threshold and a wireless-link loading metric above a second threshold.

In the first method, the linear function may take various forms. In one example, the linear function may take the form of $-aQ_{WL}+bL_{WL} \leq c$, where $Q_{WL}$ is the channel-quality metric, $L_{WL}$ is the wireless-link loading metric, and a, b, and c are configurable parameters. In this respect, one or more of the configurable parameters may be selected based on various factors, including a frequency with which the mobile station changes coverage areas of the access network. The linear function may take other forms as well. The feature of selecting the new wireless link based on the application of the linear function for each identified wireless link may also take various forms. In one example, this feature may include selecting, as the new wireless link, the identified wireless link that best satisfies the linear function. Other examples are possible as well.

A second method may include a first base station of an access network (a) deciding to initiate a handover of a communication from a first wireless link to a new wireless link, (b) identifying one or more wireless links available for the handover, (c) for each identified wireless link, determining a channel-quality metric (e.g., CINR), a wireless-link loading metric (e.g., an average percentage of assigned resources to total resources on the wireless link), and a coverage-area loading metric, (d) selecting the new wireless link based on the channel-quality metric, the wireless-link loading metric, and the coverage-area loading metric for each identified wireless link, and (e) facilitating the handover of the communication from the first wireless link to the selected new wireless link.

In the second method, the coverage-area loading metric for each identified wireless link may take various forms. In one example, if a given identified wireless link and one or more other wireless links serve a given coverage area, the coverage-area loading metric for the given identified wireless link may be a combination of the wireless-link metrics for the given identified wireless link and the one or more other wireless links. Other examples are possible as well.

Further, in the second method, the feature of selecting the new wireless link based on the channel-quality metric, the wireless-link loading metric, and the coverage-area loading metric for each identified wireless link may take various forms. In one example, this feature may include (1) prioritizing the one or more identified wireless links based on the coverage-area loading metric, (2) for each identified wireless link with a highest priority, applying a linear function that includes as variables the channel-quality metric and the wireless-link loading metric, and (3) if at least one identified wireless link with the highest priority satisfies the linear function, selecting, as the new wireless link, the identified wireless link with the highest priority that best satisfies the linear function. In this respect, the linear function may take various forms, including the forms described above with reference to the first method. In another example, before prioritizing the one or more identified wireless links based on the coverage-area loading metric, this feature may include eliminating from consideration any wireless link having one or more of a channel-quality metric below a first threshold, a wireless-link loading metric above a second threshold, and a coverage-area loading metric above a third threshold. Other examples are possible as well.

Also disclosed herein is a base station that includes (a) an antenna structure for communicating with one or more mobile stations over respective wireless links, (b) a communication interface for communicating with a network entity, (c) a processor, (d) data storage, and (e) program instructions stored in the data storage and executable by the processor for carrying out functions described herein.

These as well as other aspects and advantages will become apparent to those of ordinary skill in the art by reading the following detailed description, with reference where appropriate to the accompanying drawings.

DETAILED DESCRIPTION

Figure 1:
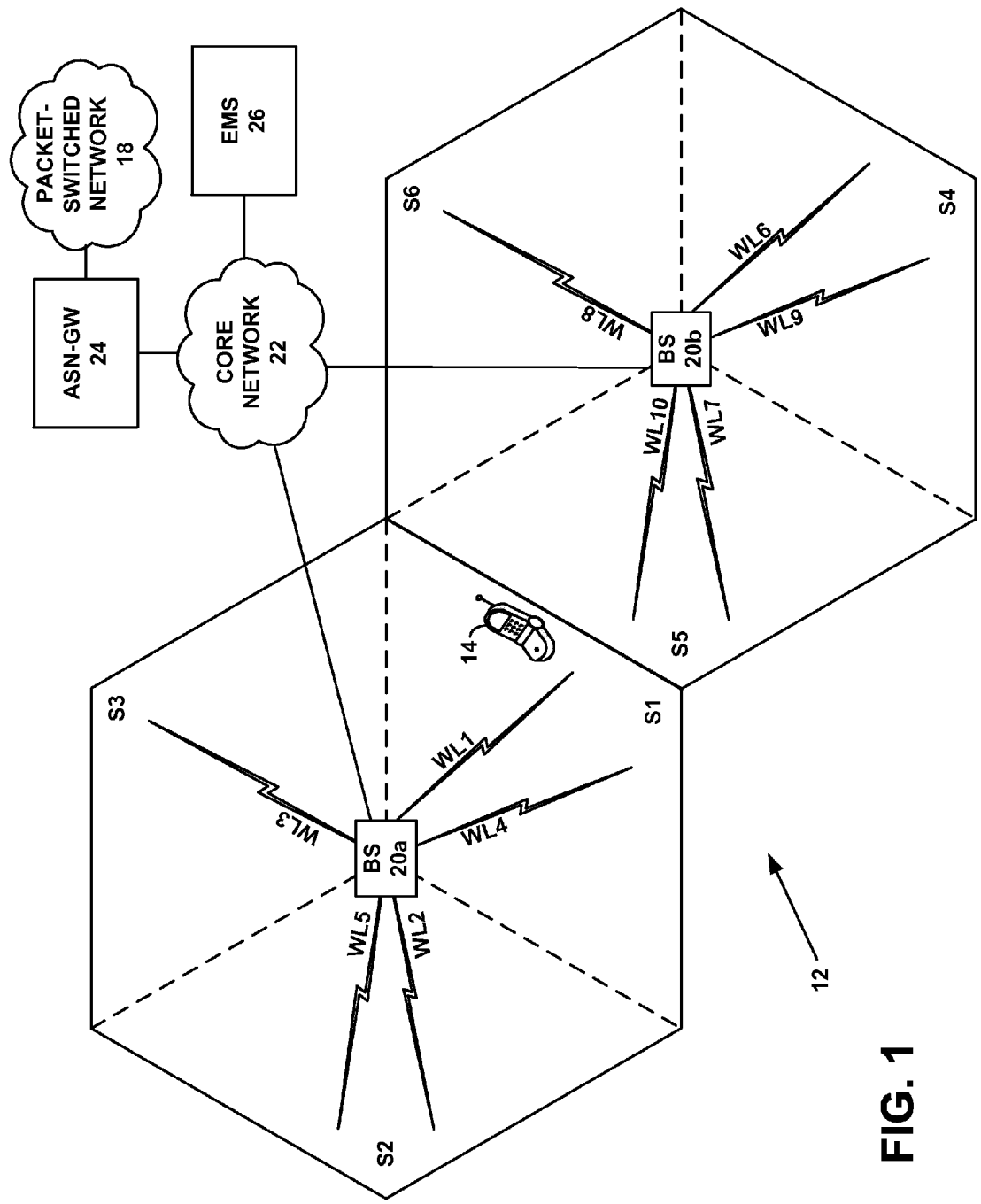
FIG. 1 is a simplified block diagram of a communication system in which an exemplary method can be implemented.

Referring to the drawings, FIG. 1 is a simplified block diagram of a communications system in which an exemplary method can be implemented. As shown, the system includes an access network 12, which may function to provide connectivity between one or more mobile stations (e.g., cell phones, PDAs, netbooks, tablets, and/or other wirelessly-equipped devices), such as a mobile station 14, and one or more packet-switched networks (e.g., the global Internet), such as a packet-switched network 18.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

As shown, access network 12 may include a plurality of base stations, such as a first base station 20a and a second base station 20b. (Although FIG. 1 depicts access network 12 as including two base stations, it should be understood that access network 12 may include more than two base stations). Each base station may be any entity that facilitates communication between one or more mobile stations and access network 12. In this respect, each base station may radiate to define one or more wireless coverage areas (e.g., cells or cell sectors). Within each coverage area, each base station may provide one or more wireless links, each on a corresponding carrier, over which mobile stations located in the coverage area may communicate with the base station. (As used herein, the term carrier may encompass a single carrier frequency or a group of carrier frequencies).

The wireless links of the base stations will preferably carry communications between access network 12 and mobile stations according to a Worldwide Interoperability for Microwave Access (WiMAX) protocol (e.g., IEEE 802.16). Alternatively, the wireless links may carry communications according to any other protocol now known or later developed, including CDMA (e.g., 1xRTT or 1xEV-DO (IS-856)), iDEN, TDMA, AMPS, GSM, GPRS, UMTS, EDGE, LTE, microwave, satellite, MMDS, Wi-Fi (e.g., IEEE 802.11), Bluetooth, and infrared. Depending on the protocol employed, the wireless links will also preferably be divided into a plurality of channels for carrying communications between mobile stations and access network 12, such as downlink channels for carrying communications from access network 12 to the mobile stations and uplink channels for carrying communications from mobile stations to access network 12.

Due to hardware and protocol constraints, each wireless link can only include a finite number of channels, and thus can only support a finite number of simultaneous communications between access network 12 and mobile stations. In this respect, to increase a number of simultaneous communications that can occur between access network 12 and mobile stations in a particular coverage area, a base station may be configured to provide multiple wireless links in that coverage area. Such a configuration may be desirable in heavily-populated coverage areas, such as those in large cities.

For purposes of illustration, FIG. 1 depicts base station 20a being configured to provide two wireless links WL1 and WL4 in a first sector S1, two wireless links WL2 and WL5 in a second sector S2, and one wireless link WL3 in a third sector S3. Similarly, FIG. 1 depicts base station 20b being configured to provide two wireless links WL6 and WL9 in a fourth sector S4, two wireless links WL7 and WL10 in a fifth sector S5, and one wireless link WL8 in a sixth sector S6. It should be understood, however, that the depicted configuration of sectors and wireless links is for purposes of illustration only, and that many other examples are possible as well.

Each base station of access network 12 may then couple to a core network 22, which provides connectivity with various other network entities. For example, core network 22 may provide connectivity with an access service node gateway (ASN-GW) 24 that functions to communicate with base station 20 and control aspects of base station 20 as well as aspects of the wireless communication with the mobile station. (Although FIG. 1 depicts access network 12 as including one ASN-GW connected to one base station, it should be understood that access network 12 may include more than one ASN-GW and that each ASN-GW may couple to multiple base stations). ASN-GW 24 may also provide connectivity with packet-switched network 18. As another example, core network 22 may provide connectivity with an element management system (EMS) 26 that functions to maintain data about the access network 12, such as data defining the configuration of the access network 12.

According to many protocols, including WiMAX, mobile station 14 and access network 12 will preferably be communicating over only a single wireless link at any given time. For example, mobile station 14 and access network 12 may initially be communicating over wireless link WL1. While communicating over wireless link WL1, mobile station 14 may periodically receive from base station 20a a MOB_NBR-ADV message that identifies the network and defines characteristics of neighbor wireless links (e.g., wireless links WL4, WL7, and WL10). After receiving a MOB_NBR-ADV message, mobile station 14 may send base station 20a a MOB-_SCN-REQ message that requests permission to scan neighbor wireless links. In turn, base station 20a may send mobile station 14 a MOB_SCN-RSP message that indicates approval or rejection of the scan request. If the scan request is approved, mobile station 14 may scan neighbor wireless links to determine their suitability as handover targets. In this respect, mobile station 14 may synchronize with each neighbor wireless link and then measure one or more channel parameters of the wireless link, such as channel quality for instance. Mobile station 14 may also report the scan results to base station 20a via a MOB_SCN-REP message.

For various reasons, mobile station 14 or access network 12 may then initiate a "handover" of the communication from wireless link WL1 to a new wireless link. For example, mobile station 14 may initiate a handover in response to various trigger events, such as detecting a decrease in channel quality of the wireless link WL1 and/or scanning a neighbor wireless link with an appreciably better channel quality, for instance. In this respect, mobile station 14 may send base station 20a a handover request (e.g., a MOB_MSHO-REQ message) that includes an identifier and one or more channel parameters for each of wireless link WL1 and one or more other wireless links detected by mobile station 14. As another example, base station 20a may initiate a handover in response to various trigger events, such as detecting that wireless link WL1 is overloaded for instance. Other examples are possible as well. After the handover is initiated, mobile station 14 and access network 12 may work together to hand over the communication from wireless link WL1 to the new wireless link. This handover procedure may take various forms.

In a typical WiMAX handover procedure, after the handover is initiated, base station 20a may identify one or more wireless links available for the handover. In this respect, base station 20a may identify the one or more identified wireless links based on one or more received messages from mobile station 14 (e.g., MOB_SCN-REP and/or MOB_MSHO-REQ messages), a list of neighbor wireless links maintained by base station 20a, and/or some other source.

Base station 20a may then determine whether each identified wireless link has sufficient channel parameters (e.g., loading, available quality of service (QoS) levels, loading per available QoS level, etc.) for the communication with mobile station 14. For example, base station 20a may determine whether each identified wireless link provided by base station 20a (e.g., wireless links WL2-WL5) has sufficient channel parameters based on data maintained at base station 20a and/or another entity accessible to base station 20a (e.g., EMS 26). In another example, base station 20a may determine whether each identified wireless link provided by base station 20b (e.g., wireless links WL6-WL10) has sufficient channel parameters based on input from base station 20b. In this respect, base station 20a may first send base station 20b a HO_notification message that provides information about the communication with mobile station 14 and identifies each identified wireless link provided by base station 20b. In turn, base station 20b may (a) determine whether each such wireless link has sufficient channel parameters based on data maintained at base station 20b and/or another entity accessible to base station 20b (e.g., EMS 26), and then (b) send base station 20a a HO_notification-RSP message indicating whether each such wireless link has sufficient channel parameters.

After determining whether each of the one or more identified wireless links has sufficient channel parameters for the communication, base station 20a may send mobile station 14 a message (e.g., a MOB_BSHO-RSP or MOB_BSHO-REQ message) that includes an identifier and perhaps one or more channel parameters for each of one or more wireless links recommended by base station 20a. In response, mobile station 14 may optionally scan the one or more recommended wireless links. Mobile station 14 may then select the new wireless link, such as the wireless link WL7 provided by base station 20b, and inform base station 20a of the selection via a MOB_HO_IND message. Thereafter, mobile station 14 and access network 12 may cease communication over wireless link WL1 provided by base station 20a and begin communication over the wireless link WL7 provided by base station 20b.

Accordingly, in the typical WiMAX handover procedure, mobile station 14 ultimately selects the new wireless link based on the limited information for the recommended wireless links to which mobile station 14 has access, which includes channel quality measured by mobile station 14 and perhaps one or more channel parameters received from base station 20a. Because mobile station 14 typically will not have access to loading information for the recommended wireless links, however, mobile station 14 does not account for loading when selecting the new wireless link. As a result, mobile station 14 may select a new wireless link that is heavily loaded, which may degrade network performance and/or force a subsequent handover from the selected wireless link to reduce the load. A handover procedure that avoids this problem by accounting for both channel quality and loading on identified wireless links is desirable.

Figure 2:
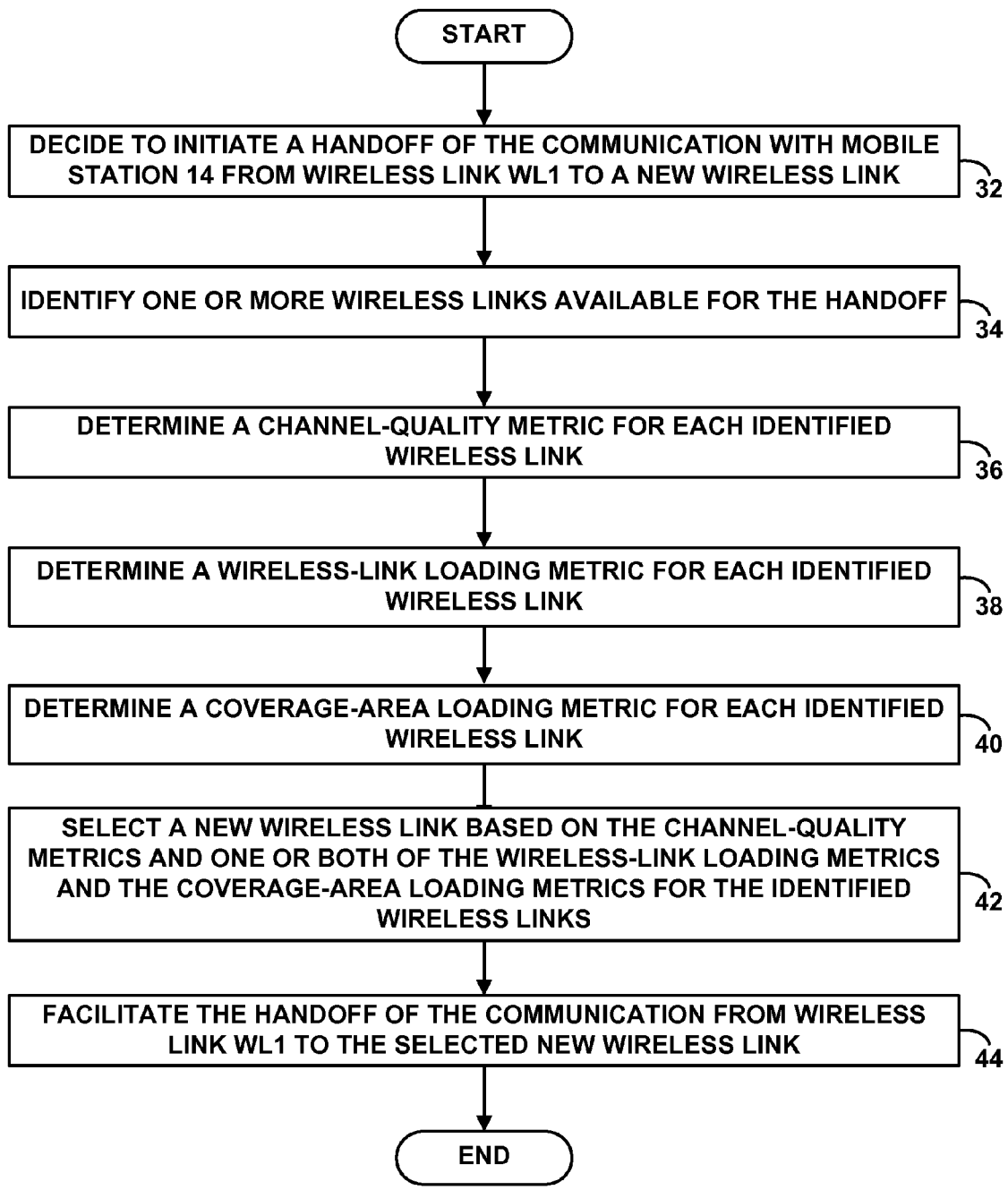
FIG. 2 is a flow chart depicting an exemplary method of handing over a communication with a mobile station from a current wireless link to a new wireless link.

FIG. 2 is a flow chart depicting an exemplary method, carried out by access network 12, of handing over a communication with a mobile station (e.g., mobile station 14) from a current wireless link to a new wireless link. For purposes of illustration, the following description will assume that access network 12 is initially engaging in a communication with mobile station 14 over wireless link WL1 in sector S1, and that base station 20a carries out the exemplary method.

At step 32, base station 20a may decide to initiate a handover of the communication with mobile station 14 from wireless link WL1 to a new wireless link. In this respect, base station 20a may decide to initiate the handover in response to various trigger events. In one example, base station 20a may decide to initiate the handover in response to receiving from mobile station 14 a handover request, such as a MOB_MSHO-REQ message, which the mobile station 12 may send in response to various trigger events (e.g., detecting a decrease in the first channel quality of wireless link WL1 and/or scanning a neighbor wireless link with an appreciably better channel quality for instance) In another example, base station 20a may decide to initiate the handover in response to determining that wireless link WL1 is overloaded. Other examples are possible as well.

At step 34, after deciding to initiate the handover, base station 20a may identify one or more wireless links available for the handover. In this respect, base station 20a may identify the one or more identified wireless links in various manners. In one example, base station 20a may identify the one or more identified wireless links based on one or more messages received from mobile station 14 identifying wireless links detected by mobile station 14 (e.g., MOB_SCN-REP and/or MOB_MSHO-REQ messages). In another example, base station 20a may identify the one or more identified wireless links based on a list of neighbor wireless links maintained by base station 20a. Other examples are possible as well.

At step 36, base station 20a may determine a channel-quality metric for each identified wireless link. Preferably, the channel-quality metric for an identified wireless link will indicate a channel quality of the identified wireless link as detected by mobile station 14. The channel-quality metric may take various forms. In one example, the channel-quality metric may be a carrier-to-interference noise ratio (CINR). In another example, the channel-quality metric may be a received signal strength indication (RSSI). Other examples are possible as well.

Base station 20a may determine the channel-quality metric for each identified wireless link in various manners. In one aspect, base station 20a may determine the channel-quality metric for each identified wireless link based on one or more messages received from mobile station 14 indicating a channel quality of each identified wireless link (e.g., MOB_SCN-REP and/or MOB_MSHO-REQ messages). In this respect, in one example, base station 20a may have previously received one or more messages from mobile station 14 indicating a channel quality of each identified wireless link, in which case base station 20a may determine the channel-quality metric for each identified wireless link based on the one or more previously-received messages. In another example, base station 20a may request that mobile station 14 scan neighbor wireless links and report the scan results back to base station 20a, in which case base station 20a may determine the channel-quality metric for each identified wireless link based on the reported scan results. The base station's request may take the form of a MOB_SCN-RSP message, a MOB_BSHO-REQ, and/or some other message now known or later developed. Base station 20a may determine the channel-quality metric for each identified wireless link in other manners as well. It should also be understood that base station 20a may identify the one or more wireless links and determine the channel-quality metric for each identified wireless link at the same time, or different times.

At step 38, base station 20a may determine a wireless-link loading metric for each identified wireless link. Preferably, the wireless-link loading metric for an identified wireless link will indicate a loading of the wireless link. The wireless-link loading metric may take various forms. In one example, the wireless-link loading metric may be an average percentage of assigned resources (e.g., slots, buffer storage, etc.) to total resources on the downlink and/or uplink of a wireless link. In another example, the wireless-link loading metric may be a number of mobile stations communicating over a wireless link. In yet another example, the wireless-link loading metric may be a number or percentage of service flows occupied for a given QoS type. In a further example, the wireless-link loading metric may be a function of modulation coding scheme (MCS), QoS, and resource utilization of a wireless link. Many other examples are possible as well.

Base station 20a may determine the wireless-link loading metric for each identified wireless link in various manners. In one aspect, base station 20a may determine the wireless-link loading metric for each identified wireless link based on data indicating a loading of wireless links of access network 12 (e.g., Available Radio Resource indicators), which may be maintained at one or more entities of access network 12. In a preferred example, each base station in access network 12 will maintain data indicating a loading of its own respective wireless links, in which case base station 20a will maintain data indicating a loading of wireless links WL1-WL5 and base station 20b will maintain data indicating a loading of wireless links WL6-WL10. Base station 20a may then obtain the data indicating a loading of one or more of wireless links WL6-WL10 by sending base station 20b a request for such data (e.g., a RRM_Spare_Capacity_REQ message) and then receiving such data in a report from base station 20b (e.g., RRM_Spare_Capacity_RPT). Base station 20a may determine the wireless-link loading metric for each identified wireless link in other manners as well.

At step 40, base station 20a may also optionally determine a coverage-area loading metric for each identified wireless link. Preferably, the coverage-area loading metric for an identified wireless link will indicate a loading of the identified wireless link's coverage area, which may differ from a loading of the identified wireless link itself if the coverage area is served by multiple wireless links. The coverage-area loading metric may take various forms. In one example, the coverage-area loading metric may be an average percentage of assigned resources to total resources on a coverage area's one or more wireless links. In another example, the coverage-area loading metric may be a number of mobile stations communicating over a coverage area's one or more wireless links. In yet another example, the coverage-area loading metric may be a function of modulation coding scheme (MCS), QoS, and slot utilization of a coverage area's one or more wireless links. Other examples are possible as well.

Base station 20a may determine the coverage-area loading metric for each identified wireless link in various manners. In one aspect, base station 20a may first identify a given identified wireless link's coverage area based on data defining wireless links of access network 12, which may be maintained at one or more entities of access network 12 (e.g., EMS 26). In a preferred example, each base station in access network 12 will maintain or have access to data defining its own respective wireless links and its neighbor wireless links, in which case base station 20a will maintain or have access to data defining each of wireless links WL1-WL10.

After identifying the given identified wireless link's coverage area, base station 20a may then determine a loading metric for the identified coverage area—and thus the coverage-area loading metric of the given identified wireless link—based on the wireless-link loading metrics for the one or more wireless links serving the coverage area. For example, if only the given identified wireless link serves the coverage area, base station 20a may determine that the loading metric for the coverage area—and thus the coverage-area loading metric for the given identified wireless link—is equal to the wireless-link loading metric for the given identified wireless link. As another example, if the given identified wireless link and one or more other wireless links serve the coverage area, base station 20a may determine that the loading metric for the coverage area—and thus the coverage-area loading metric for the given identified wireless link—is computed as a function of the wireless-link loading metrics for the given identified wireless link and the one or more other wireless links (e.g., a maximum, minimum, and/or aggregate of the wireless-link loading metrics). Base station 20a may determine a coverage-area loading metric for each identified wireless link in other manners as well.

At step 42, base station 20a may then select a new wireless link based on the channel-quality metrics and one or both of the wireless-link loading metrics and the coverage-area loading metrics for the identified wireless links. Base station 20a may perform this selection process by employing various techniques.

In a preferred technique, for each identified wireless link, base station 20a may apply a linear function that includes as variables the channel-quality metric and the wireless-link loading metric. In this respect, the linear function may take various forms. In one example, the linear function may take the form of:

$$-aQ_{WL}+bL_{WL} \leq c,$$

where $Q_{WL}$ is the channel-quality metric, $L_{WL}$ is the wireless-link loading metric, and a, b, and c are configurable parameters. While applying the linear function for each identified wireless link, base station 20a may eliminate from consideration any identified wireless link that fails to satisfy the linear function. From the remaining identified wireless links, base station 20a may then select, as the new wireless link, the identified wireless link that best satisfies the linear function (e.g., the identified wireless link with the lowest value of $-aQ_{WL}+bL_{WL}$, and thus the best combination of channel quality and wireless-link loading).

In a similar technique, for each identified wireless link, base station 20a may apply a linear function that includes as variables the channel-quality metric and the coverage-area loading metric. In this respect, the linear function may take various forms. In one example, the linear function may take the form of:

$$-aQ_{WL} + bL_{CA} \leq c,$$

where $Q_{WL}$ is the channel-quality metric, $L_{CA}$ is the coverage-area loading metric, and a, b, and c are configurable parameters. While applying the linear function for each identified wireless link, base station 20a may eliminate from consideration any identified wireless link that fails to satisfy the linear function. From the remaining identified wireless links, base station 20a may then select, as the new wireless link, the identified wireless link that best satisfies the linear function (e.g., the identified wireless link with the lowest value of $-aQ_{WL} + bL_{CA}$, and thus the best combination of channel quality and coverage-area loading).

In another technique, base station 20a may eliminate from consideration any identified wireless link that fails to satisfy one or more of a channel-quality threshold (e.g., 6 or 12 dB), a wireless-link loading threshold (e.g., 70%), and/or a coverage-area loading threshold (e.g., 70%). For example, base station 20a may apply a minimum channel-quality threshold to eliminate from consideration any identified wireless link with a channel-quality metric below that threshold. As another example, base station 20a may apply a maximum wireless-link loading threshold to eliminate from consideration any identified wireless link with a wireless-link loading metric above that threshold. As yet another example, base station 20a may apply a maximum coverage-area loading threshold to eliminate from consideration any identified wireless link wireless link with a coverage-area loading metric above that threshold. Other examples are possible as well. If necessary, after applying these thresholds and perhaps eliminating one or more identified wireless links from consideration, base station 20a may apply other selection techniques to the remaining identified wireless links, to select the new wireless link.

In yet another technique, base station 20a may prioritize the one or more identified wireless links based on the channel-quality metric, the wireless-link loading metric, and/or the coverage-area loading metric. For example, base station 20a may prioritize the one or more identified wireless links based on a channel-quality metric, in which case base station 20a may assign a higher priority to wireless links with a higher channel-quality metric and a lower priority to wireless links with a lower channel-quality metric. As another example, base station 20a may prioritize the one or more identified wireless links based on a wireless-link loading metric, in which case base station 20a may assign a higher priority to wireless links with a lower wireless-link loading metric and a lower priority to wireless links with a higher wireless-link loading metric. As yet another, base station 20a may prioritize the one or more identified wireless links based on a coverage-area loading metric, in which case base station 20a may assign a higher priority to wireless links with a lower coverage-area loading metric and a lower priority to wireless links with a higher coverage-area loading metric. Other examples are possible as well.

After prioritizing the one or more identified wireless links, base station 20a may then apply one or more other selection techniques to each identified wireless link with the highest priority, to select the new wireless link. In some cases, however, base station 20a may determine that the new wireless link cannot be selected from the highest-priority identified wireless links using the other selection techniques. For example, base station 20a may determine that each identified wireless link with the highest priority fails to satisfy one or more of a channel-quality threshold, a wireless-link loading threshold, and/or a coverage-area loading threshold. As another example, base station 20a may determine that each identified wireless link with the highest priority fails to satisfy a linear function that includes as variables the channel-quality metric and the wireless-link loading metric. Other examples are possible as well. In this respect, base station 20a may then apply one or more other selection techniques to each identified wireless link with the next-highest priority, to select the new wireless link. Base station 20a may continue this process until it selects the new wireless link or exhausts the list of identified wireless links.

While employing any of the above techniques, base station 20a may also consider a frequency with which mobile station 14 changes coverage areas. For example, if mobile station 14 changes coverage areas often, base station 20a may afford the channel-quality metric a greater weight than the wireless-link and/or coverage-area loading metrics, such as by prioritizing the identified one or more wireless links based on the channel-quality metric and/or increasing a relative to b in the exemplary linear function. As another example, if mobile station 14 changes coverage areas only occasionally, base station 20a may afford the wireless-link and/or coverage-area loading metrics a greater weight than the channel-quality metric, such as by prioritizing the one or more identified wireless links based on the wireless-link or coverage-area loading metrics and/or increasing b relative to a in the exemplary linear function. Other examples are possible as well. Base station 20a may determine the frequency with which mobile station 14 changes coverage areas using any technique now known or later developed.

Figure 3:
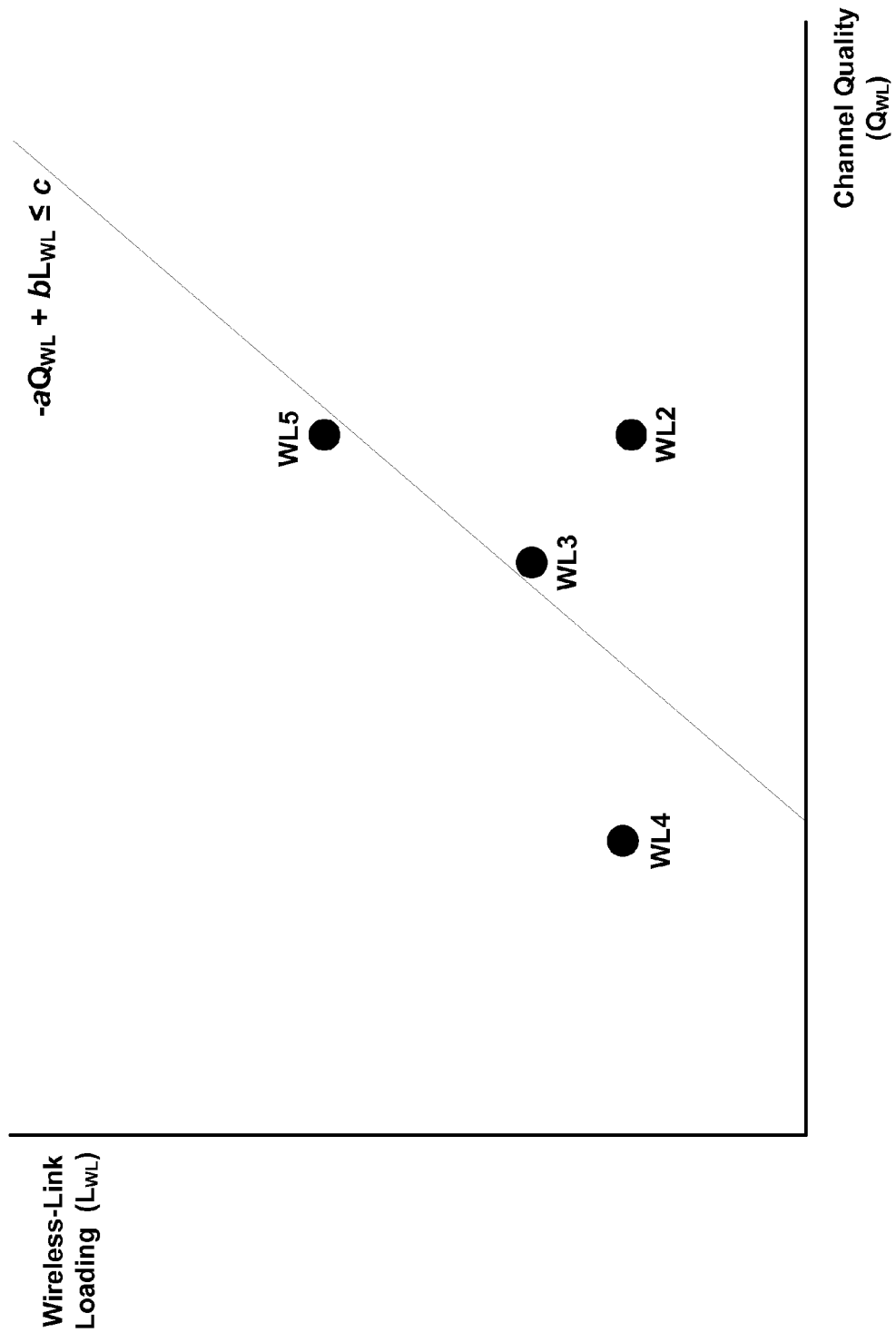
FIG. 3 is a graphical representation of an exemplary linear function and exemplary channel-quality and wireless-link loading metrics for each of wireless links WL2-WL5 depicted in FIG. 1.

It should be understood that base station 20a may apply any of these selection techniques, either alone or in combination, to select the new wireless link. A few examples of base station 20a employing these techniques to select the new wireless link will now be described with reference to FIG. 3, which is a graphical representation of an exemplary linear function and exemplary channel-quality and wireless-link loading metrics for each of wireless links WL2-WL5. As shown in FIG. 3, the exemplary linear function is represented as a line and the exemplary channel-quality and wireless-link loading metrics for each of wireless links WL2-WL5 are represented as coordinates. For purposes of illustration, FIG. 3 and the following discussion assumes that sector S1 has a loading of 40%, sector S2 has a loading of 60%, and sector S3 has a loading of 80%.

In one example, to select the new wireless link, base station 20a may simply apply the exemplary linear function from each identified wireless link, without employing any other selection technique. In this respect, with reference to FIG. 3, base station 20a may determine that wireless links WL2 and WL3 satisfy the linear function because their coordinates are below the line and that wireless links WL4 and WL5 fail to satisfy the linear function because their coordinates are above the line. Base station 20a may then determine that wireless link WL2 best satisfies the linear function because its coordinate is most below the line. As such, in this example, base station 20a may select wireless link WL2 as the new wireless link.

In another example, to select the new wireless link, base station 20a may first eliminate from consideration any identified wireless link that fails to satisfy each of a channel-quality threshold, a wireless-link loading threshold, and a coverage-area loading threshold. In this respect, base station 20a may first eliminate from consideration (a) wireless link WL4 because its channel-quality metric is less than a channel-quality threshold and (b) wireless link WL3 because its coverage-area loading metric is greater than a coverage-area loading threshold. Base station 20a may then apply the exemplary linear function to remaining identified wireless links WL2 and WL5. In this respect, with reference to FIG. 3, base station 20a may determine that wireless link WL2 satisfies the linear function because its coordinate is below the line and that wireless link WL5 fails to satisfy the linear function because its coordinate is above the line. As such, in this example, base station 20a may select wireless link WL2 as the new wireless link.

In yet another example, to select the new wireless link, base station 20a may first prioritize the identified wireless links based on a coverage-area loading metric. In this respect, base station 20a may assign the highest priority to wireless link WL4 because sector S1 has the lowest loading, the next-highest priority to wireless links WL2 and WL5 because sector S2 has the next-lowest loading, and the lowest priority to wireless link WL3 because sector S3 has the highest loading. Base station 20a may then apply the exemplary linear function to the highest-priority available link WL4. In this respect, with reference to FIG. 3, base station 20a may determine that wireless link WL4 fails to satisfy the linear function because its coordinate is above the line. Base station 20a may then apply the exemplary linear function to next-highest-priority identified wireless links WL2 and WL5. In this respect, with reference to FIG. 3, base station 20a may determine that wireless link WL2 satisfies the linear function because its coordinate is below the line and that wireless link WL5 fails to satisfy the linear function because its coordinate is above the line. As such, in this example, base station 20a may select wireless link WL2 as the new wireless link.

At step 44, after selecting the new wireless link, base station 20a may facilitate the handover of the communication from the wireless link WL1 to the selected new wireless link. For example, base station 20a may send mobile station 14 a message that instructs mobile station 14 to cease communication over the current wireless link and begin communication over the selected new wireless link. This message may take the form of a MOB_BSHO-RSP message, a MOB_B-SHO-REQ message, or some other message now known or later developed. As another example, if the selected new wireless link is provided by base station 20a, then base station 20 a may reserve resources on the selected new wireless link for the communication. As yet another example, if the selected new wireless link is provided by base station 20b, then base station 20a may send base station 20b a message notifying base station 20b of the handover to the selected new wireless link (e.g., a HO_confirmation message), which may cause base station 20b to reserve resources on the selected new wireless link for the communication. As still another example, the base station 20a may cease communication with mobile station 14 over wireless link WL1 and release any resources reserved for that communication. Base station 20a may perform other functions to facilitate the handover of the communication from the wireless link WL1 to the selected new wireless link as well.

Advantageously, the exemplary handover procedure disclosed herein enables a base station 20a to consider both channel quality and loading (e.g., wireless-link and/or coverage-area loading metric) when selecting a new coverage area for the communication with mobile station 14. In this respect, the exemplary handover procedure disclosed herein also enables a base station 20a to consider coverage-area loading, which may provide a more accurate indication of loading in a system with coverage areas having multiple wireless links. Accordingly, by employing the exemplary handover procedure, base station 20a may be able to select a new coverage area that can better handle the communication with mobile station 14.

Figure 4:
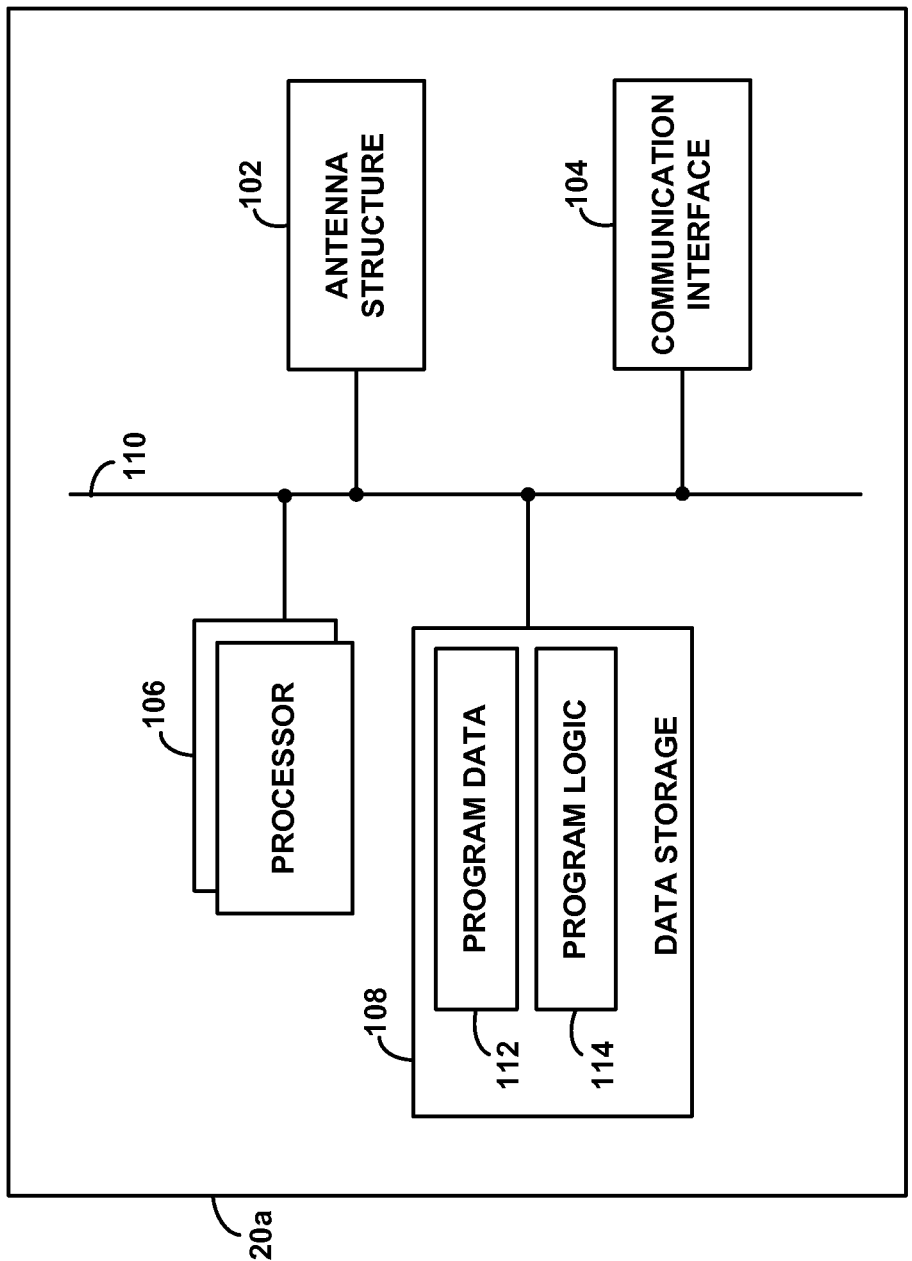
FIG. 4 is a simplified block diagram showing functional components of an exemplary base station capable of carrying out the exemplary method of FIG. 2.

FIG. 4 is a simplified block diagram showing functional components of an exemplary base station 20a capable of carrying out the exemplary method of FIG. 2. As shown in FIG. 4, exemplary base station 20a may include an antenna structure 102, a communication interface 104, a processor 106, and data storage 108, all linked together via a system bus, network, or other connection mechanism 110.

Referring to FIG. 4, antenna structure 102 may be the component of exemplary base station 20a that radiates to define one or more wireless coverage areas and provide one or more wireless links within each wireless coverage area. For purposes of illustration, the following description will assume that antenna structure 102 is configured to provide two wireless links WL1 and WL4 in sector S1, two wireless links WL2 and WL5 in sector S2, and one wireless link WL3 in sector S3. Antenna structure 102 may include one or more antennas arranged in various ways. For example, the one or more antennas may include one or more directional (e.g., sectored) antennas. Other configurations are also possible.

Communication interface 104 preferably functions to communicatively couple exemplary base station 20a to one or more network entities, such as ASN-GW 24. As such, communication interface 104 may take the form of an Ethernet network interface card, a chipset and antenna adapted to facilitate wireless communication according a desired protocol, and/or any other form that provides for wired and/or wireless communication with ASN-GW 24. Communication interface 104 may also include multiple communication interfaces, such as one through which exemplary base station 20a sends data to ASN-GW 24 and one through which exemplary base station 20a receives data from ASN-GW 24. Other configurations are also possible.

Processor 106 may comprise one or more general purpose microprocessors and/or dedicated signal processors. (The term "processor" encompasses either a single processor or multiple processors that could work in combination.) Data storage 108, in turn, may comprise memory and/or other storage components, such as optical, magnetic, organic or other memory, which can be volatile and/or non-volatile, internal and/or external, and integrated in whole or in part with processor 106. Data storage 108 preferably contains or is arranged to contain (i) program data 112 and (ii) program logic 114. Although these components are described herein as separate data storage elements, the elements could just as well be physically integrated together or distributed in various other ways. In a preferred example, program data 112 would be maintained in data storage 108 separate from program logic 114, for easy updating and reference by program logic 114.

Program data 112 may contain information relating to the wireless links of exemplary base station 20a. For example, program data 112 may contain an identifier each wireless link provided by exemplary base station 20a. As another example, program data 112 may contain an identifier of a coverage area served by each wireless link provided by exemplary base station 20a. As yet another example, program data 112 may one or more channel parameters for each wireless link provided by exemplary base station 20a, such as estimated QoS, estimated bandwidth, and capacity. Other examples are possible as well.

Program data 112 may also contain information relating to the mobile stations engaging in communication with exemplary base station 20a. For example, program data 112 may contain an identifier of each mobile station 14 engaging in communication with exemplary base station 20a. As another example, for each mobile station engaging in communication with exemplary base station 20a, program data 112 may contain an identifier for each of the wireless link over which the mobile station is currently communicating and one or more other wireless links detected by the mobile station. As yet another example, for each mobile station engaging in communication with exemplary base station 20a, program data 112 may contain an indication of channel quality (e.g., CINR and/or RSSI) for each of the wireless link over which the mobile station is currently communicating and one or more other wireless links detected by the mobile station. Program data 112 may contain other types of data as well.

Program logic 114 preferably comprises machine-language instructions that may be executed or interpreted by processor 106 to carry out functions in accordance with the exemplary method described in FIG. 2. It should be understood, however, that program logic 114 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

In one aspect, program logic 114 may be executable by processor 106 to employ the exemplary method described above to hand over a communication with a mobile station from a current wireless link to a new wireless link. For example, program logic 114 may be executable by processor 106 to (a) decide to initiate a handover of the communication with a mobile station from a current wireless link to a new wireless link, (b) identify one or more wireless links available for the handover, (c) determine a channel-quality metric for each identified wireless link, (d) determine a wireless-link loading metric for each identified wireless link, (e) determine a coverage-area loading metric for each identified wireless link, (f) based on the channel-quality metrics and one or both of the wireless-link loading metrics and the coverage-area loading metrics for the identified wireless links, and (g) facilitate the handover of the communication from the first wireless link to the selected new wireless link.

Exemplary embodiments have been described above. Those skilled in the art will understand, however, that changes and modifications may be made to the embodiments described without departing from the true scope and spirit of the present invention, which is defined by the claims.

We claim:

1. A method of handing over a communication with a mobile station between wireless links of an access network, the method comprising:
    an access network deciding to initiate a handover of a communication with a mobile station from a first wireless link to a new wireless link;
    the access network identifying a plurality of wireless links available for the handover, wherein the plurality of wireless links includes at least one wireless link serving a coverage area that is also served by one or more other wireless links;
    for each identified wireless link, the access network (a) determining a channel-quality metric that indicates a channel quality of the identified wireless link and a wireless-link loading metric that indicates a loading of the identified wireless link and (b) applying a linear function that takes the form of $-aQ_{WL}+bL_{WL} \leq c$, wherein $Q_{WL}$ is the channel-quality metric, $L_{WL}$ is the wireless-link loading metric, and a, b, and c are configurable parameters;
    the access network selecting the new wireless link based on the application of the linear function for each identified wireless link; and
    the access network facilitating the handover of the communication from the first wireless link to the selected new wireless link.

2. The method of claim 1, wherein deciding to initiate a handover of the communication from the first wireless link to a new wireless link comprises deciding to initiate a handover of the communication from the first wireless link to a new wireless link in response to the access network receiving a handover request from the mobile station.

3. The method of claim 1, wherein deciding to initiate a handover of the communication from the first wireless link to a new wireless link comprises deciding to initiate a handover of the communication from the first wireless link to a new wireless link in response to the access network determining that the first wireless link is overloaded.

4. The method of claim 1, wherein the channel-quality metric comprises a carrier-to-interference noise ratio received from the mobile station.

5. The method of claim 1, wherein the wireless-link loading metric for each identified wireless link comprises an average percentage of assigned resources to total resources on the identified wireless link.

6. The method of claim 1, wherein the configurable parameters are selected based on a frequency with which the mobile station changes coverage areas of the access network.

7. The method of claim 1, wherein the first base station selecting the new wireless link based on the application of the linear function for each wireless link comprises:
    selecting, as the new wireless link, the identified wireless link that best satisfies the linear function.

8. The method of claim 1, further comprising:
    before selecting the new wireless link based on the application of the linear function for each wireless link, the access network eliminating from consideration any identified wireless link having one or both of a channel-quality metric below a first threshold and a wireless-link loading metric above a second threshold.

9. A method of handing over a communication with a mobile station between wireless links of an access network, the method comprising:
    an access network deciding to initiate a handover of a communication with a mobile station from a first wireless link to a new wireless link;
    the access network identifying a plurality of wireless links available for the handover, wherein the plurality of wireless links includes at least one wireless link serving a coverage area that is also served by one or more other wireless links;
    for each identified wireless link, the access network determining a channel-quality metric that indicates a channel quality of the identified wireless link, a wireless-link loading metric that indicates a loading of the identified wireless link, and a coverage-area loading metric that indicates a loading of the coverage area served by the identified wireless link;
    the access network assigning a priority level to each identified wireless link based on the coverage-area loading metric for the identified wireless link;
    for each identified wireless link having been assigned a highest priority level, the access network applying a linear function that takes the form of $-aQ_{WL}+bL_{WL} \leq c$, wherein $Q_{WL}$ is the channel-quality metric, $L_{WL}$ is the wireless-link loading metric, and a, b, and c are configurable parameters;

the access network selecting the new wireless link based on the application of the linear function for each identified wireless link having been assigned the highest priority level;

and the access network facilitating the handover of the communication from the first wireless link to the selected new wireless link.

10. The method of claim 9, wherein deciding to initiate a handover of the communication from the first wireless link to a new wireless link comprises deciding to initiate a handover of the communication from the first wireless link to a new wireless link in response to the access network receiving a handover request from the mobile station.

11. The method of claim 9, wherein deciding to initiate a handover of the communication from the first wireless link to a new wireless link comprises deciding to initiate a handover of the communication from the first wireless link to a new wireless link in response to the access network determining that the first wireless link is overloaded.

12. The method of claim 9, wherein the channel-quality metric for each identified wireless link comprises a carrier-to-interference noise ratio received from the mobile station.

13. The method of claim 9, wherein the wireless-link loading metric for each identified wireless link comprises an average percentage of assigned resources to total resources on the identified wireless link.

14. The method of claim 9, wherein the coverage-area loading metric for a given identified wireless link serving a given coverage area that is also served by one or more other wireless links comprises a combination of the wireless-link metric for the given identified wireless link and a respective wireless-link metric for each of the one or more other wireless links.

15. The method of claim 9 wherein the configurable parameters are selected based on a frequency with which the mobile station changes coverage areas.

16. The method of claim 9, further comprising:

before assigning a priority level to each identified wireless link based on the coverage-area loading metric for the identified wireless link, eliminating from consideration any identified wireless link having one or more of a channel-quality metric below a first threshold, a wireless-link loading metric above a second threshold, and a coverage-area loading metric above a third threshold.

17. A base station comprising:

an antenna structure for communicating with one or more mobile stations operating in an access network over at least a first wireless link;

a communication interface for communicating with one or more entities in an access network;

a processor;

data storage; and program instructions stored in the data storage and executable by the processor for:

deciding to initiate a handover of a communication with a mobile station from the first wireless link to a new wireless link of the access network;

identifying a plurality of wireless links available for the handover, wherein the plurality of wireless links includes at least one wireless link serving a coverage area that is also served by one or more other wireless links;

for each identified wireless link, (a) determining channel-quality metric that indicates a channel quality of the identified wireless link and a wireless-link loading metric that indicates a loading of the identified wireless link and (b) applying a linear function that takes the form of $-aQ_{WL}+bL_{WL} \leq c$, wherein $Q_{WL}$ is the channel-quality metric, $L_{WL}$ is the wireless-link loading metric, and a, b, and c are configurable parameters;

selecting the new wireless link based on the application of the linear function for each identified wireless link; and facilitating the handover of the communication from the first wireless link to the selected new wireless link.

\* \* \* \* \*